United States Patent [19]

Sjogren

[11] 4,117,203

[45] Sep. 26, 1978

[54] RECHARGEABLE BATTERY ENCLOSURE

[75] Inventor: Axel O. Sjogren, Littleton, Colo.

[73] Assignee: The Gates Rubber Company, Denver, Colo.

[21] Appl. No.: 887,267

[22] Filed: Mar. 16, 1978

Related U.S. Application Data

[62] Division of Ser. No. 738,417, Nov. 3, 1976.

[51] Int. Cl.² ........................................... H01M 14/00
[52] U.S. Cl. ............................................ 429/7; 429/49; 429/121; 429/178
[58] Field of Search ...................... 429/159, 7, 149–158, 429/160, 1, 49, 178, 121; 307/150; 339/152, 183

[56] References Cited

U.S. PATENT DOCUMENTS

| | | | |
|---|---|---|---|
| 3,220,888 | 11/1965 | Moore et al. | 429/159 X |
| 3,977,907 | 8/1976 | Roth et al. | 429/7 |

Primary Examiner—Charles F. LeFevour
Attorney, Agent, or Firm—Curtis H. Castleman, Jr.; Raymond Fink; H. W. Oberg, Jr.

[57] ABSTRACT

A one-piece top closure for a battery enclosure such as a lantern battery is described including a substantially planar top surface in which is integrally mounted a recharge jack of improved design, and in another embodiment there is disclosed discrete spacer elements integral with the top closure and which project to bridge the space from the surface of the top closure to the electrochemical cells contained within the enclosure.

5 Claims, 7 Drawing Figures

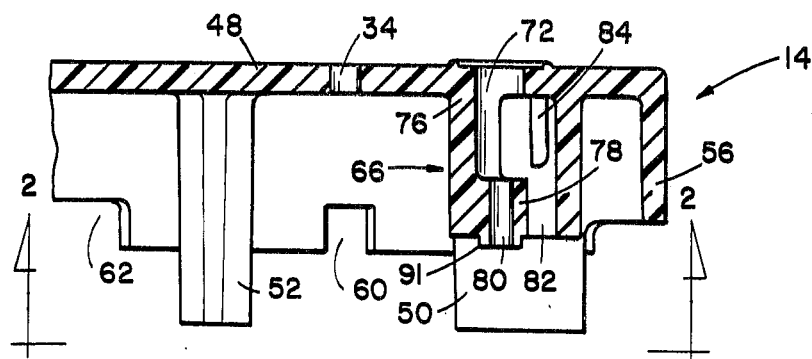
FIG. 3
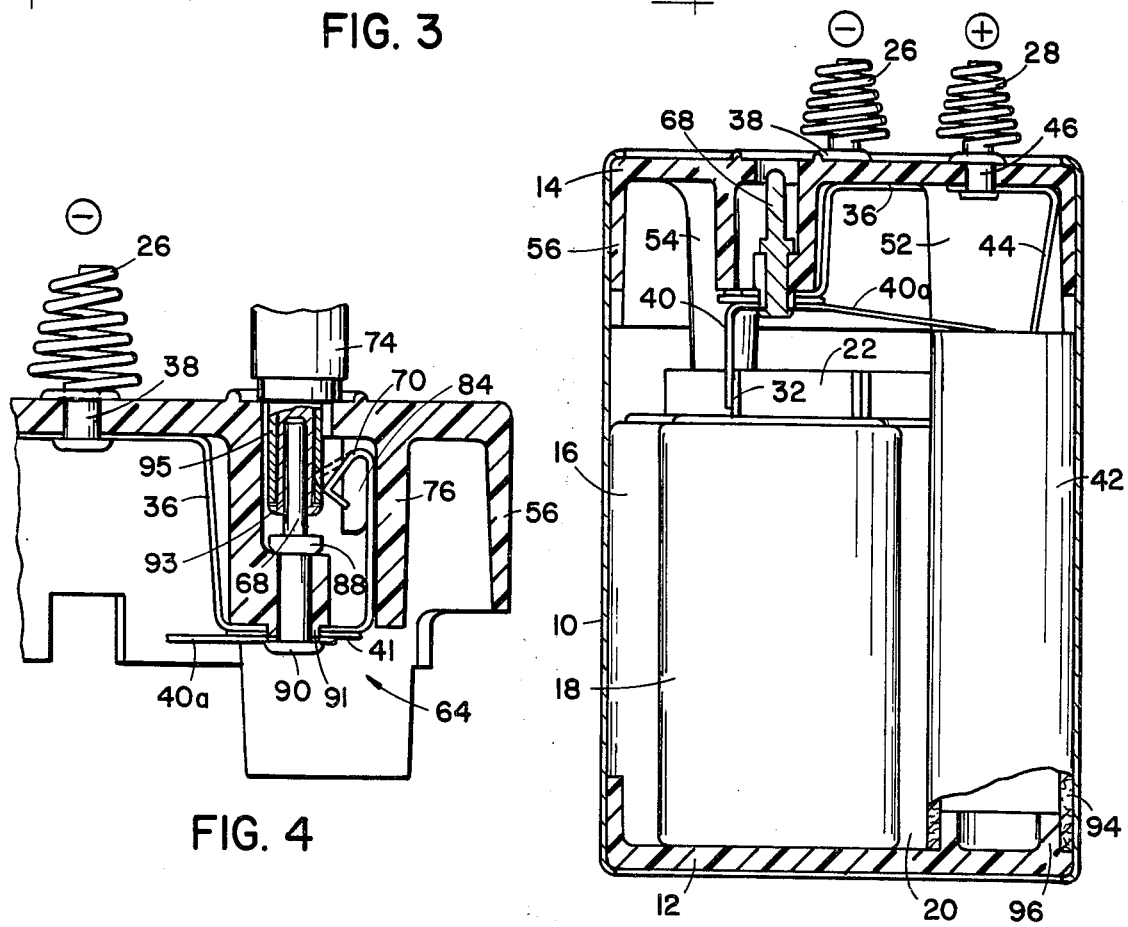
FIG. 4
FIG. 5
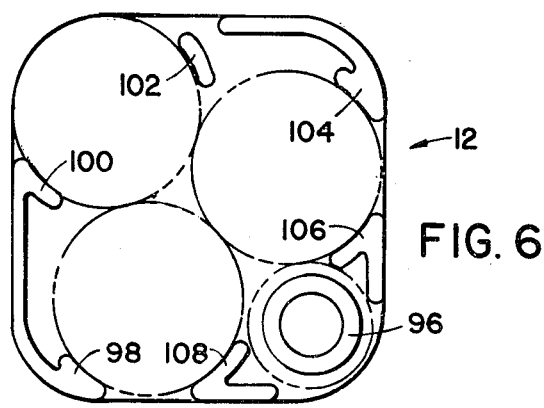
FIG. 6

RECHARGEABLE BATTERY ENCLOSURE

This is a division of application Ser. No. 738,417, filed on Nov. 3, 1976.

BACKGROUND OF THE INVENTION

This invention relates particularly to rechargeable battery enclosures, and to a top closure therefore in which is integrally mounted a rechargeable jack assembly for reception preferably of a coaxial type recharge plug.

A rechargeable battery closure of the type disclosed by this invention is shown in U.S. Pat. No. 3,977,907 to Roth et al. Battery enclosures of this type may be used advantageously in lantern battery structures, rechargeable flashlight enclosures, and various other rechargeable devices housing a battery adapted to be recharged.

It is a primary object of the subject invention to provide an enclosure for at least one self-contained electrochemical cell or battery, which includes spacer elements and locating means providing an assembly which is substantially immobilized and impact and vibration resistant.

It is another object of the invention to provide a battery top closure of a single one-piece molded construction including a unitary recharge jack, having a minimum number of parts, and providing ease of assembly and reliability.

SUMMARY OF THE INVENTION

In one aspect of the invention, the battery construction comprises an enclosure, and a plurality of self-contained electrochemical cells electrically interconnected and housed within the enclosure, and a pair of output terminals mounted on the enclosure. The improved enclosure includes a top closure from which is spaced a bottom closure, a side closure surrounding the electrochemical cells and mounted to the top and bottom closures, and the top closure having discrete integral projecting spacing elements bridging the space extending from the uppermost surface of the top closure to the cells.

In another aspect, the bottom closure of the battery enclosure has a generally planar bottommost surface from which project a plurality of discrete upstanding locator stops which, together with the side closure, limit movement of the cells relative to the enclosure.

In still another embodiment, a rechargeable battery construction is disclosed comprising an enclosure, a plurality of electrically connected electrochemical cells housed within the enclosure, and a pair of terminals mounted on the enclosure. An improved recharge jack is mounted in the enclosure and includes a one-piece molded housing having a central axial opening for receiving a recharge plug, an apertured landing positioned coaxially with and disposed below the central opening and a lower window opening surrounding the landing and connected to the central opening. A conductive post is disposed in the aperture of the landing and penetrates the central opening to serve as a first contact of the jack. Spring contact means penetrates the lower window opening and has a forward portion which is disposed in the central opening to serve as the second contact of the jack.

BRIEF DESCRIPTION OF THE DRAWINGS

The invention will be more particularly described in its preferred embodiments which in conjunction with the accompanying drawings, in which like numerals designate like parts, and in which:

FIG. 3 is a partial sectional view taken along lines 3—3 of FIG. 2, flipped 180° bottom to top;

FIG. 4 is a partial sectional view similar to FIG. 3, but including the completed jack assembly with recharge plug engaged;

FIG. 5 is a partial sectional view taken generally along lines 5—5 of FIG. 1;

FIG. 6 is an inside top plan view of the bottom closure element; and

PREFERRED EMBODIMENTS OF THE INVENTION

Figure 1:
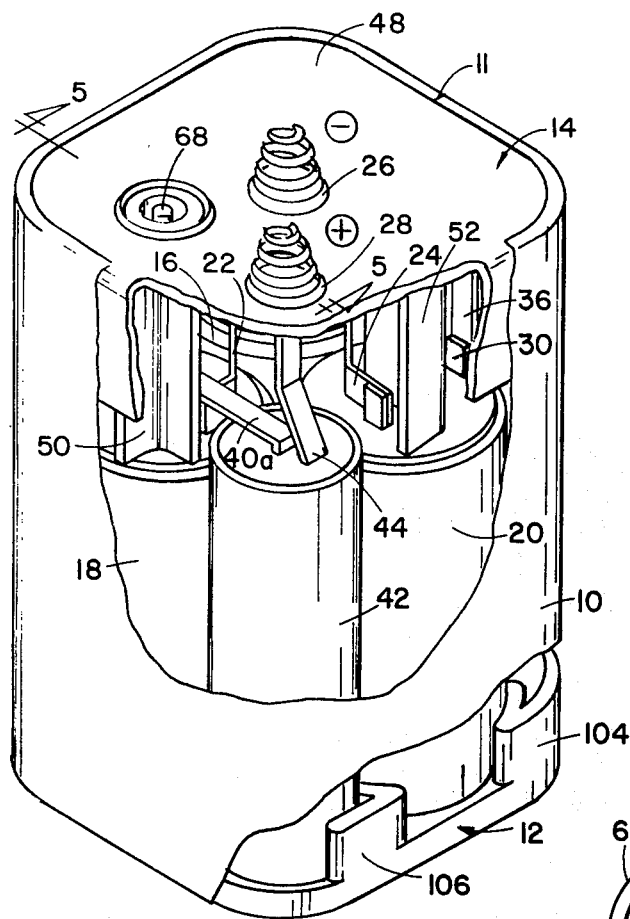
FIG. 1 is a partial cutaway perspective view of a battery, e.g., a lantern battery, including the improved top closure of the invention.
Figure 2:
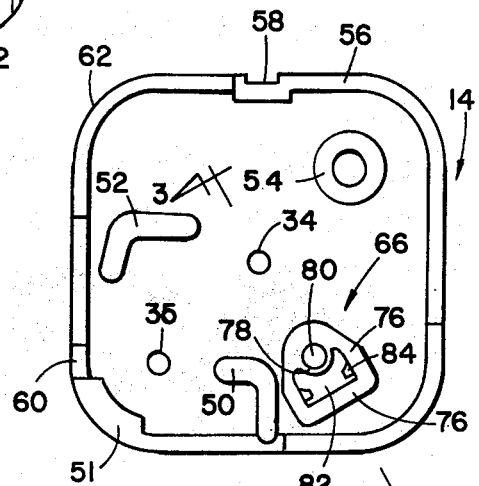
FIG. 2 is an underside plan view of the one-piece top closure of the battery, viewed generally along 2—2 of FIG. 3, showing only the complete molded plastic construction and omitting all electrical connections.

While the invention will be described with respect to a rechargeable lantern battery structure, and more particularly to an improved top closure and recharge jack therefore, it will be appreciated that the invention broadly covers other types of battery enclosures within which is positioned one or more electrochemical cells forming a battery. As used herein and in the claims, the phrase a "plurality of self-contained electrochemical cells" also means a standard battery of cells housed in a unitary container, and the like.

Referring now to the drawings, a lantern battery assembly is shown generally comprising a molded bottom closure 12, a unitary one-piece top closure 14, and a side closure 10 having a seam 11 and being crimped or otherwise securely mounted on the top and bottom closures. Within the enclosure is contained a battery formed of three series connected electrochemical cells 16, 18, 20. The cells are series connected by conductive straps 22, 24. The battery is provided with negative post 30 and positive post 32.

The negative post 30 is connected to output terminal 26 through orifice 34 in the top lid closure 14 via connecting conductive strap 36 and through-the-wall rivet 38. The positive lug 32 of the battery (FIG. 5), on the other hand, is connected to positive output terminal 28 through orifice 35 via conductive leads 40, 40a, dropping resistor 42, lead 44 and rivet 46. Element 42 could also be a short circuit relay, for instance, or could be omitted altogether (shorted).

In accordance with one aspect of the invention, the battery top closure 14 is formed of a one-piece molded construction having a generally planar top 48 from which depends a plurality of discrete integral projecting spacing elements 50, 52, 54 which bridge the space extending from the upper surface 48 of the top closure to the upper surface of each of the cells, 16, 18, 20, respectively. These spacing elements may be of any desired shape providing they possess sufficient rigidity to prevent substantial lengthwise displacement of the cells within the container. The top 14 also includes a peripheral, integrally molded skirt 56 having a notch 58 to receive the seam of the side closure can 10, and a plurality of windows, e.g., at 60, 62 to assist soldering of various of the connectors to the battery lugs during assembly. This skirt increases the impact strength of the top four corners. In assembled form as shown in FIGS. 1 and 5, each of the discrete depending spacing elements bear substantially directly on each of the cells.

It is also preferred to employ projection 51 of skirt 56 to rest against element 42 to restrain its vertical movement.

The entire top structure 14 is preferably molded of an impact resistant plastic such as high impact polystyrene.

There is also provided as a unitary portion of the top member 14, in accordance with the invention, an integral recharge jack assembly 64, which generally comprises one-piece molded housing 66 integral and unitary with top closure 14, a conductive post 68 serving as the positive contact, and spring contact 70 which serves as the negative contact when recharging.

Housing 66 in turn includes a central axial opening 72 for receiving recharge plug 74, sidewalls 76 surrounding the central opening, landing 78 having an aperture 80 which is positioned coaxially with and disposed below the central opening 72, and lower window opening 82 surrounding landing 78 and connected with the central axial opening.

The housing preferably contains ears 84 which protrude to form an interlocking engagement with cooperating side slots 86 formed in the spring contact means thereby preventing substantial lateral displacement of the spring within the housing.

The entire battery top 14 together with housing 66 may be formed from a two-part mold provided with appropriate draft angles.

Conductive post 68 is provided with a flange or ledge 88 which bears on landing 78, and a lower portion 90 which is initially hollowed out and thereafter staked or riveted to hold conductors 40 and 36 in place and sandwiching interposed insulator disk 41. Upstanding insulating neck or collar 91 insures that negative lead 36 is free from contact with post 68.

The recharge plug 74 may be of conventional coaxial construction with an inner conductive member 93 which makes contact with post 68, and an outer conductive surface 95 which makes contact with spring contact means 70, as it moves from its (phantom) rest position to its resiliently biased contact position shown in FIG. 4. It is preferred that the plug bottoms out at the upper surface 48 of the top closure rather than bottoming out on flange 88, although the latter may also be employed. In customary fashion, recharge plug 74 supplies recharging current from any suitable source such as a standard DC charging circuit.

Figure 7:
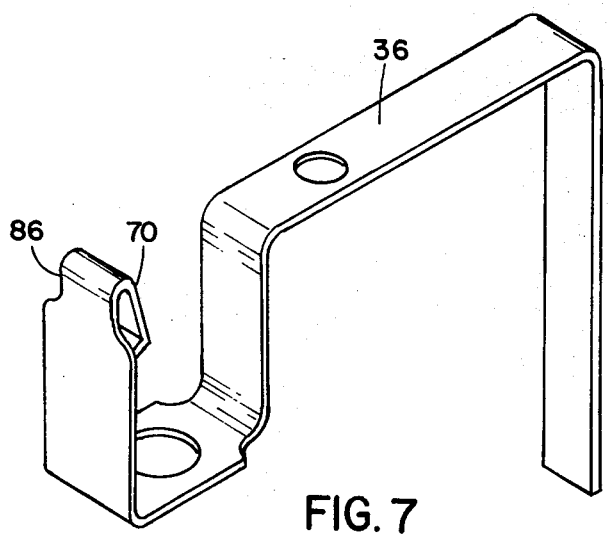
FIG. 7 is a perspective view of a jack spring contact means and combined electrical connector for the negative terminal of the battery.

In a preferred embodiment, as shown in FIG. 7, the spring contact means is unitary with conductor 36 thereby serving not only as the negative pole of the recharge jack, but also making contact with the negative output terminal of the battery and the negative pole 30 of the battery, thereby insuring continuity in the electrical connection and reduced member of parts for ease of assembly.

It is another feature of the invention that a preferred bottom closure 12 is employed which is provided with means for limiting movement of the cells relative to themselves and the overall battery enclosure. As seen particularly in FIG. 6, the bottoms of each of the three cells would be positioned as shown in phantom, and resistive element 42 has a lower protruding cylindrical portion 94 which telescopes over upstanding locator ring 96. A plurality of additional upstanding locator stops 98, 100, 102, 104, 106 and 108 locate the cells and, together with side closure 10, virtually prevent any significant lateral movement of the cells. These stops are preferably formed of arc segments adapted to make intimate contact circumferentially with the cell containers. The outside surfaces of the locator stops increase the stiffness of the sidewalls of the assembly to better resist impact loads.

If element 42 is a resistor for current limiting, particularly to safeguard against short circuiting, the element preferably has a positive temperature coefficient of at least about $5,900 \times 10^{-6}$ OHM/OHM/° C. In one example, resistor 42 had a resistance of 1.5 ohms at room temperature, and after short circuiting terminals 26 and 28, the resistance climbed to within 3.0 – 3.4 ohms.

It will be appreciated that the invention is capable of a variety of modifications and variations which will become apparent to those skilled in the art upon a reading of the specification. These variations and modifications are intended to be included within the scope of the invention.

What is claimed is:

1. In a rechargeable battery construction comprising an enclosure, a plurality of electrically connected electrochemical cells housed within the enclosure, and a pair of terminals mounted on the enclosure, an improved recharge jack mounted in the enclosure comprising:

a one-piece molded housing integral and unitary with at least a portion of the enclosure;
   said housing having a central axial opening for receiving a recharge plug, an apertured landing positioned coaxially with and disposed below the central opening, and a lower window opening surrounding the landing and connected to the central opening;
   a conductive post disposed in the aperture of the landing and penetrating the central opening and serving as a first contact of the jack; and
   spring contact means penetrating the lower window opening and having a forward portion disposed in the central opening serving as a second contact of the jack.

2. The battery construction of claim 1 wherein the spring contact means has a rearward portion connected serially with one of the output terminals of the battery mounted on the enclosure and the corresponding polarity output terminal of the battery of electrochemical cells.

3. The battery construction of claim 1 wherein the enclosure comprises a top closure, a bottom closure spaced from the top closure, and a side closure surrounding the electrochemical cells and mounted to the top and bottom closures, and wherein the top closure and recharge jack housing are formed of a unitary molded high impact polymeric material.

4. The battery construction of claim 1 including means for lockingly engaging the forward portion of the spring contact means within the housing to prevent substantial lateral displacement of the forward portion of the spring contact means.

5. The battery construction of claim 4 wherein the engaging means includes a pair of ears formed integrally in the central axial opening of the housing, and wherein the spring contact means has a pair of side slots which engage the ears and thereby prevent said lateral displacement of the forward portion of the spring contact means.

* * * * *